April 16, 1963     A. J. YERMAN ET AL     3,085,431
FLOW MEASURING APPARATUS
Filed Dec. 28, 1959     2 Sheets-Sheet 1
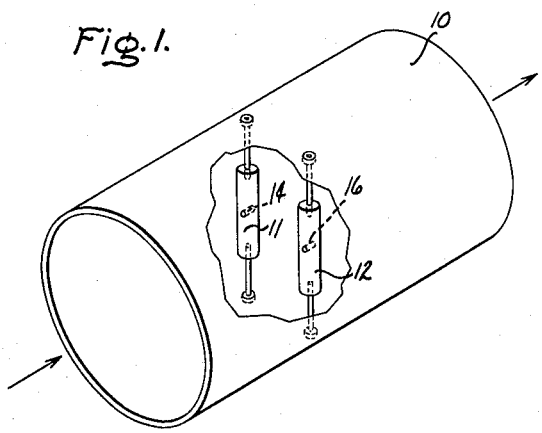
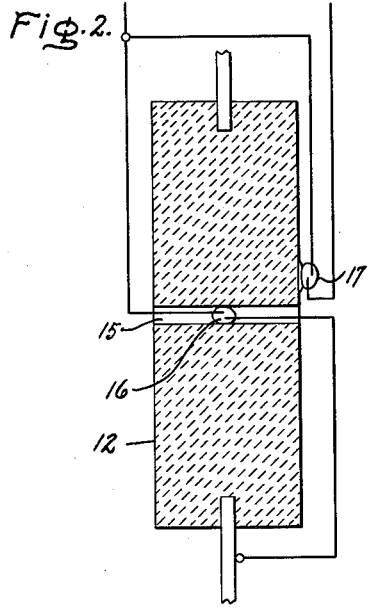
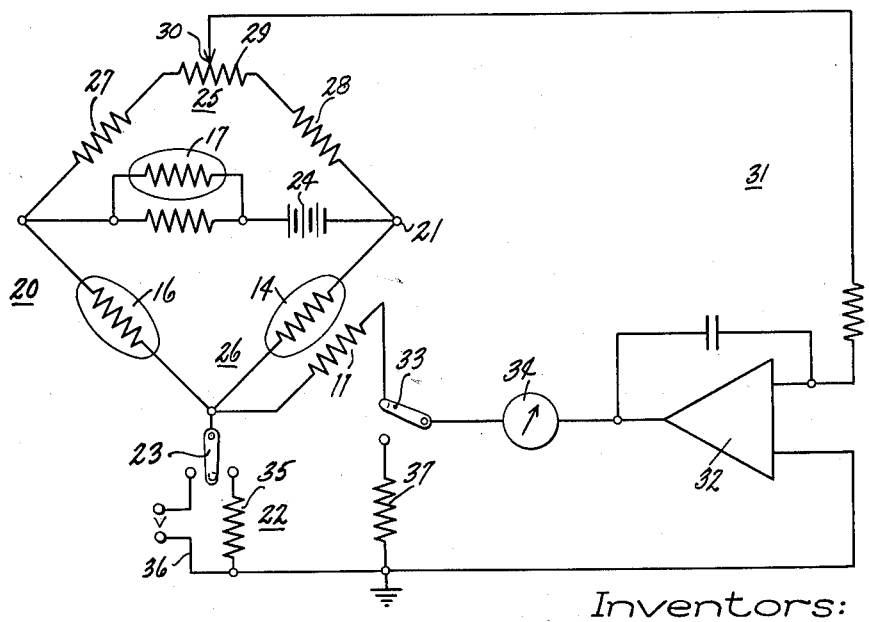
Inventors:
Alexander J. Yerman,
Milton D. Bloomer,
by J. David Blumenfeld
Their Attorney.

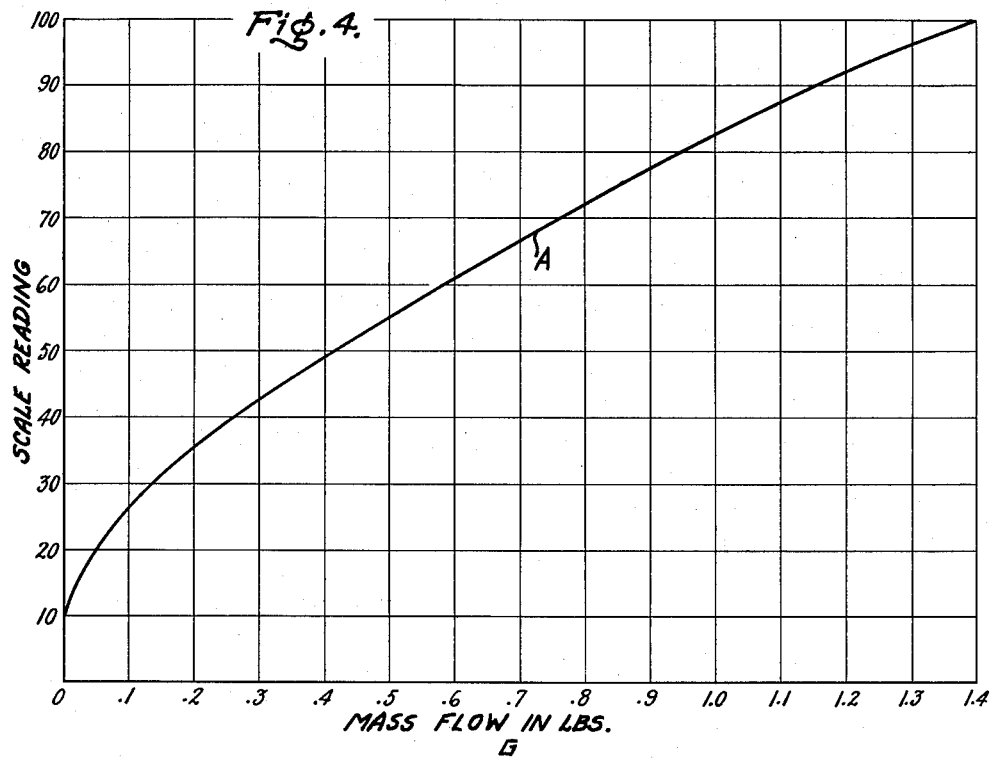
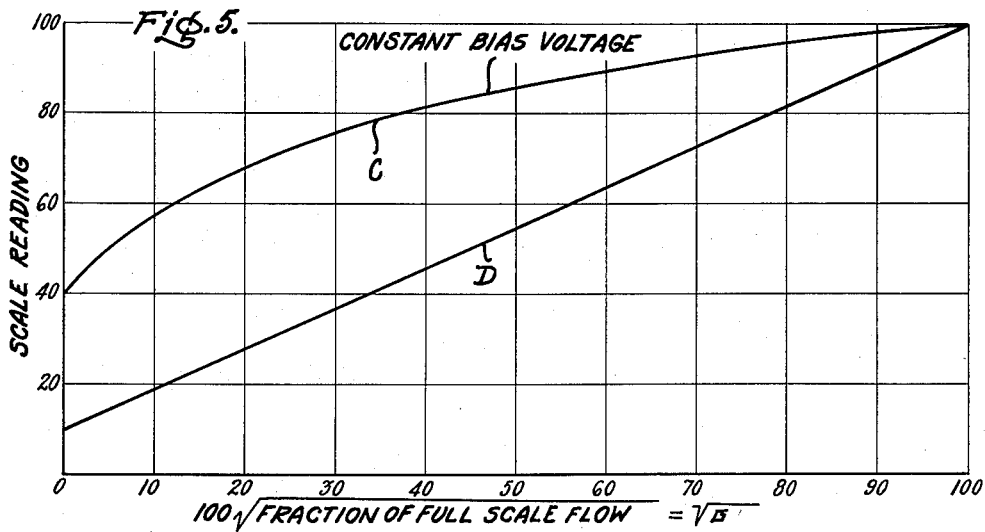

United States Patent Office 3,085,431
Patented Apr. 16, 1963

3,085,431
FLOW MEASURING APPARATUS
Alexander J. Yerman and Milton D. Bloomer, Scotia, N.Y., assignors to General Electric Company, a corporation of New York
Filed Dec. 28, 1959, Ser. No. 2,789
5 Claims. (Cl. 73—204)

This invention relates to an apparatus for measuring fluid flow, and more particularly to a non-mechanical flow measuring device utilizing thermally sensitive elements.

In measuring the flow of liquid and gaseous fluids it has been proposed to utilize the so-called "hot wire anemometer" principle in which a heated thermally sensitive element is disposed in a fluid stream to be cooled by the fluid at a rate which is a function of the magnitude of its flow. The thermally sensitive element, which is usually a temperature sensitive resistance, is connected in an electrical control network so that resistance variations due to flow of fluid results in a varying electrical output signal from the network. A feedback network responsive to the output signal controls the flow of heating current through the thermally sensitive element to heat the element sufficiently to counteract the cooling effect of the fluid flow. The heating current necessary to counteract the cooling effect of the fluid provides a measure of the magnitude of the fluid flow in terms of fluid velocity, fluid volume flow, or mass flow of the fluid. While such an arrangement is useful for many purposes, it has been found that the system is sensitive to changes in ambient fluid temperatures.

In order to correct for variations in ambient fluid temperatures a second unheated thermally sensitive resistance element is disposed in the fluid stream. This second element is therefore maintained at ambient fluid temperature and reflects any changes as corresponding changes in resistance to produce compensating effects in the control network. While this approach partially overcomes some of these shortcomings such a system is still subject to temperature errors particularly where a wide range of flow conditions is to be measured.

It is an object of this invention, therefore, to provide a novel fluid flow measuring apparatus of great accuracy over a wide range of ambient temperatures and flow velocities:

A further object of this invention is to provide a fluid flow measuring apparatus in which compensation for temperature dependent errors may be made over the entire range of ambient temperatures and flow velocity.

To achieve high accuracy and freedom from temperature dependent errors it is contemplated to separate the heating and sensing function of the thermally sensitive element by heating it indirectly. In this fashion any variations in heating of the two thermally sensitive elements due to fluid friction effects at high flow velocities or differences in recovery factor for the two sensitive elements may be corrected over a wide range of temperatures and flow conditions.

The significance of this feature may be more easily grasped if it is considered that normally it is difficult if not impossible to match the temperature-resistance characteristics of two temperature sensitive resistances over a range of temperature. Also at high flow velocities the sensitive elements will come to equilibrium several degrees higher than the free stream temperature, and one element will generally assume a different temperature from the other due to variations in recovery factor. Therefore, any network calibrated to balance at "no flow" or static conditions at a particular fluid temperature will be unbalanced at the actual flow condition and fluid temperature resulting in flow sensitive and temperature sensitive errors. By heating the thermally sensitive element indirectly, it is possible to interrupt the current to the heating element at the operating temperature and flow conditions to permit balancing out or compensating for such sources of error.

The magnitude of the recovery factor, which is usually less than unity, is a function of the geometry of the thermally sensitive member. It will be obvious then from this discussion, that two thermally sensitive elements disposed in a given fluid stream may not have the same recovery factor because of minute differences in their physical configuration. This, of course, introduces further errors which vary with flow velocity. Again by heating one of the thermally sensitive elements indirectly rather than heating it directly by current conduction, it becomes possible to adjust and balance the network continuously at operating flow conditions to compensate for such variations.

It is another object of this invention therefore to provide a fluid flow measuring device utilizing an indirectly heated thermally sensitive element;

One additional undesirable feature resulting from changes in ambient fluid temperature is that the sensitivity of the elements and hence that of the measuring system decreases with increasing temperature. It is, therefore, desirable to provide temperature compensation by increasing the network energizing voltage as the temperature increases to offset the decreasing network sensitivity at higher temperatures and maintain a substantially constant sensitivity.

It is yet another object of this invention therefore that this invention provide a fluid flow measuring apparatus in which the sensitivity is constant over a wide range of temperatures.

Flow measuring devices which utilize two thermally sensitive elements maintained at a predetermined temperature differential, have a nonlinear output characteristic which is especially pronounced at low flow velocities. It has been found that it is possible to linearize the output characteristics by varying the temperature differential between the sensing and reference elements as a function of flow.

It still another object of this invention, therefore, to provide a linearized fluid flow measuring apparatus in which the temperature differential between the thermally sensitive element is varied as a function of flow.

Other objects and advantages of the invention will become apparent as the description thereof proceeds.

In accordance with the invention the foregoing objects are achieved by providing an apparatus in which a pair of thermally sensitive elements are disposed in a fluid stream. The thermally sensitive elements are connected in a bridge circuit which produces an electrical output in response to the bridge condition changes due to cooling of one of the elements. One of the thermally sensitive elements is heated by a separate heater positioned in heat exchange relationship therewith to maintain this element at a temperature above the ambient fluid temperature. The output signal from the bridge controls a feedback loop which supplies heating current to the heater to maintain a predetermined temperature differential between the two elements at various flow conditions. The heater current required to maintain this temperature difference is measured and provides an indication of the magnitude of the flow conditions.

A switching arrangement in the feedback loop permits interruption of the heater current to allow the operator to adjust the bridge balance at operating flow conditions.

A third thermally sensitive element is connected to the bridge energizing source to vary the bridge supply voltage and offset decreases in bridge sensitivity with increasing temperature. A variable bias source may be selectively connected in series with the bridge to control the input to the feedback loop in such a manner that the temperature differential between the reference and temperature sensing devices is varied as a function of flow.

The novel features which are believed to be characteristic of this invention are set forth with particularity in the appended claims. The invention itself, however, both as to its organization and method of operation, together with further objects and advantages thereof, may best be understood by reference to the following description taken in connection from the accompany drawings in which:

FIGURE 1 is an isometric view of the thermally sensitive elements mounted in a fluid stream;

FIGURE 2 is a sectional view of one of the structures of FIGURE 1 illustrating the manner in which the thermally sensitive elements are mounted;

FIGURE 3 is a circuit diagram of this fluid flow measuring device of the instant invention; and FIGURES 4 and 5 are graphs useful in understanding the instant invention.

Referring now to FIGURE 1 of the drawings, a cylindrical duct 10 is shown as part of the flow path of the fluid to be measured. A pair of potted cylindrical resistance elements 11 and 12 are supported in the duct at right angles to the direction of fluid flow illustrated by the arrows. Resistance 11 is connected through a suitable lead extending through duct 10 to a source of heater current which heats resistance 11. A small hole 13 drilled through th ebody of resistance 11 supports a thermally sensitive element 14. Resistance 12, as may be seen most clearly in the sectional view of FIGURE 2, also has a hole 15 drilled through its body portion and supports a thermally sensitive reference element 16. The resistance element 12 is secured to duct 10 but is not connected to a source of heating current so that both the resistance 12 and the thermally sensitive element 16 attain the ambient fluid stream temperature.

A third thermally sensitive element 17 is fastened to the outside of resistance 12 by means of a suitable adhesive and, in a manner to be described in detail later in connection with the circuit diagram of FIGURE 3, may be connected to provide temperature compensation to control the sensitivity of the apparatus.

In a preferred form of the invention, the thermally sensitive elements 14, 16, and 17 are fabricated of a semiconductor material having a negative temperature coefficient of resistance. Such elements are known to those skilled in the art as "thermistors" and have the characteristic of decreasing resistance with increasing temperature. The resistance-temperature characteristics of such thermistors is defined by the equation $$R = ae^{\frac{-b}{T+273}} \quad (1)$$

where the constants $a$ and $b$ are determined by the particular material from which the thermistor is made and the particular unit employed, and the expression $T+273$ converts the temperature to the absolute scale (K.°). It is apparent from Equation 1 that the resistance of the element decreases exponentially with temperature and hence may be considered as having a negative temperature coefficient of resistance.

If a pair of thermally sensitive elements, such as the thermistors 14 and 16 shown in FIGURE 1, are disposed in a fluid stream and one is heated to a temperature $t_t$ above ambient and the other is maintained at ambient fluid stream temperature $t_f$, the amount of heat removed from the system by the flow of fluid over the heated thermistor may be defined by the equation $$q = hA(t_t - t_f) \quad (2)$$

where $q$ = heat loss in B.t.u./hr.
$h$ = heat transfer coefficient in B.t.u./hour/ft.²/F.°
$A$ = the effective area of the thermistor
$t_f$ = the ambient fluid stream temperature in F.°
$t_t$ = the heated thermistor temperature in F.°

Rewriting Equation 2 above it takes the form $$q = hA\Delta t \quad (3)$$

where $\Delta t$ is the temperature differential maintained between the thermistor 14 and the thermistor 16. Since this differential is due exclusively to the $I^2R$ heat loss in the resistor element 11, Equation 3 above may be written as $$hA\Delta t = I^2R \quad (4)$$

For a generally cylindrical thermistor element, the heat transfer coefficient $h$ is defined by the equation $$h = C_1 + C_2 G^{0.5} \quad (5)$$

where $C_1$ and $C_2$ = constants
$G$ = the mass flow of the fluid

Reference is hereby made to the text Heat Transmission, MacAdams, Second Edition, McGraw-Hill, New York (1942), particularly pages 220–221 for a detailed discussion of Equation 5 above.

Assuming now that in some manner sufficient current is caused to flow through the heating resistance 11 to maintain the temperature differential $\Delta t$ between the thermistors 14 and 16 constant for all flow conditions, Equation 5 may be rewritten as $$I^2R = C_3 + C_4 G^{0.5} \quad (6)$$

where $$C_3 = C_1 A \Delta t \quad (6a)$$

$$C_4 = C_2 A \Delta t \quad (6b)$$

Rewriting Equation 6 above in order to express it in terms of mass flow, the equation takes the following form $$G = \left[\frac{I^2R - C_3}{C_4}\right]^2 \quad (7)$$

Under the following conditions:

$$\frac{C_3}{C_4} << \frac{I^2R}{C_4}$$

i.e., heat transfer losses due to fluid flow are large compared to those at "no flow" (i.e., those due to natural conduction, radiation and convection), the mass flow $G$ can be defined as $$G = C_5 I^4$$

where $$C_5 = \frac{R}{C_4}$$

In other words, mass flow of the fluid is proportional to the 4th power of the heater current necessary to maintain the fixed temperature differential $\Delta t$ between the two thermistors.

FIGURE 3 illustrates a circuit arrangement to supply sufficient heat energy to one of the thermistors to establish and maintain the desired differential $\Delta t$ so that an indication of the mass flow of the fluid may be obtained by measuring the heater current. To this end, an electrical network 20, which includes the reference thermistor 16 and the heated sensing thermistor 14, is provided to generate an electrical output signal in response to the cooling effects of the fluid flow on the heated thermistor 14. The network 20 comprises a bridge network 21 which has the thermistors 14 and 16 connected therein and a biasing network 22 which may be selectively connected to one terminal of the bridge network through a manually operated switch 23. The purpose and the manner of functioning of the biasing network 22 will be explained in detail later although it may be stated at this point that it provides a biasing voltage in response to heater current flow which is effective in conjunction with the output from the bridge circuit 21 to vary the temperature differential Δt as a function of the fluid flow.

Bridge 21 is connected in a normal Wheatstone bridge arrangement having a branch 25 including a pair of fixed linear resistances 27 and 28 and a variable potentiometer resistance 29 having a movable tap 30 as two arms of the bridge. A second branch 26 includes the two thermistors 14 and 16 connected as the other arms of the bridge. The branches 25 and 26 are connected across a source of energizing voltage such as the direct current battery 24 connected in series with a shunted temperature sensitive voltage dropping resistance 17. The shunted temperature compensating thermistor 17 is provided to vary the sensitivity of the bridge with ambient temperature changes.

The output from the bridge 21, appearing between movable slider 30 and the junction of the thermistors 16 and 14, controls a feedback network 31 to supply sufficient heater current to heating resistance 11 to maintain the desired temperature relationship.

Feedback network 31 includes an amplifier 32 which supplies the variable heater current in response to the input from the movable slider 30. Amplifier 32 is preferably an integrating amplifier although any high gain amplifier may be used. The output current from the integrating amplifier is thus varied in response to the electrical output from the network 20 which in turn depends on the cooling effect of the fluid flow on the heated thermistor element 14. Integrating amplifiers such as the one illustrated schematically at 32 produce output currents which are proportional to the time integral of the input voltage from the network 20. For a further discussion of the construction and functioning of such integrating amplifiers reference is hereby made to Electronic Analog Computers—Korn and Korn, First Edition, McGraw-Hill Book Company, Inc., New York (1952), and particularly pages 16–19 thereof.

The output from the amplifier 32 is supplied through a switch arrangement 33 to the heating resistance 11 to generate sufficient heat to maintain the sensing thermistor 14 at the desired temperature above ambient. The circuit for the heater current is completed through the second switch 23 which connects resistance 11 to ground either through a bias resistance 35 or the input terminals 36 to which a fixed biasing voltage varying from 0→V is connected. The feedback loop 31 thus amplifies the output signal from the network 20 and produces a sufficient large heating current to maintain the sensing thermistor 14 at a predetermined elevated temperature.

It has been pointed out previously that under certain conditions (i.e., sufficient feedback to maintain Δt) the mass flow G of the fluid which cools the sensing thermistor 14 is proportional to the 4th power of the heating current required to maintain the temperature differential. This heating current is measured by means of a current measuring device 34 connected in series with resistance 11. The current meter 34 is preferably a thermocouple measuring instrument. The reason is that the deflection of such a thermocouple instrument is proportional to $I^2R$ and hence the mass flow of the fluid is then proportional to the square of the scale reading rather than being proportional to the 4th power of the scale reading as it would be with a linear instrument. The actual mass flow G may then be determined from a calibration curve such as FIGURE 4 in which the scale reading is plotted along the ordinate and the flow in pounds per minute along the abscissa.

The manual switch 33 in the output circuit of the integrating amplifier 32 is provided so that heating current may be interrupted from time to time and the bridge balanced for actual flow conditions by disconnecting heater 11 and connecting the amplifier output to a dummy resistance 37. The operator balances the bridge 21 while the switch is in the "down" position by adjusting the slider 30 on the bridge potentiometer 29 until a constant output current flows from amplifier 32 and no further movement of the pointer on the current measuring device 34 can be observed at which time the bridge is balanced.

The continuous balancing feature made possible by the combination of indirect heating of sensing thermistor 14 and the switching arrangement in the feedback network results in a high accuracy instrument over a wide range of temperatures and conditions. As discussed briefly before, it is normally practically impossible to match the resistance-temperature characteristics of the two thermistors 14 and 16. Although the bridge 21 may be initially balanced for one ambient temperature it is slightly unbalanced with a different ambient so that a zero error is introduced which changes with temperature. However, by providing the switching arrangement the bridge may be balanced at the actual operating temperatures before a reading is taken eliminating the zero error.

It is also generally impractical and very difficult to match the geometry and position of the two thermistors in the fluid stream so that they exhibit identical recovery factors. At high fluid velocities the total or stagnation temperature of the fluid may be substantially higher than the static or "no flow" temperature. If the two thermistors exhibit different recovery factors, a further temperature difference is superimposed on that due to the heater current and a temperature error which varies with fluid flow magnitude is introduced. For example, at a flow velocity of 16,000 feet per minute the total or stagnation temperature is 3.6° C. higher than the static stream temperature. If there is any difference in recovery factors between the two thermistors this may reflect itself as a difference in the temperature sensed by the thermistors which may be a substantial fraction of the 3.6° C. Even a difference of 1° C. or less in the sensed temperature between the two thermistors results in a large resistance change which introduces serious measuring inaccuracies. By providing the switching arrangement in the feedback network, which may be either manual or automatic bridge 21 is rebalanced at actual stream conditions before a measurement is made eliminating any and all such errors.

Bridge 21 is also provided with a sensitivity compensating arrangement which offsets the decreasing sensitivity of the thermistors with increasing temperature. The reference and the sensing thermistors 14 and 16 are characterized by the fact that their resistance decreases exponentially with increasing temperature. At the higher temperatures, therefore, the change in resistance with an incremental change of temperature is less than it is at lower temperatures. The degree of bridge unbalance and hence the magnitude of the output signal from the bridge is similarly effected and the over-all sensitivity of the entire arrangement is reduced with increasing temperature. In order to overcome this effect, a shunted compensating thermistor 17 which is explained in detail with reference to FIGURES 1 and 2, is attached to the resistance 12 and is connected in parallel with a fixed dropping resistor connected in series with the bridge energizing voltage source 31. Therefore, as the temperature increases the resistance of thermistor 17 decreases decreasing the equivalent resistance of the parallel arrangement. The voltage drop across the parallel voltage dropping resistance arrangement is reduced and the bridge energizing voltage is increased. The sensitivity of the bridge increases correspondingly and the over-all sensitivity of the flow measuring arrangement is maintained substantially constant in spite of the variations of the ambient fluid stream temperature.

In operation the system of FIGURE 3 operates in a manner which may be described as follows: Assume for the moment that the fluid in duct 10 is stationary so that the thermistors 14, 16, and 17 see "no flow" conditions. Let it be further assumed that at "no flow" conditions the fluid ambient temperature is, for example, 25° C. and switch 33 is in its lower position so that no heater current flows through heater resistance 11 and switch 23 is in its extreme left position and V is adjusted to equal zero. At this ambient temperature reference and sensing thermistors 14 and 16 and compensating thermistor 17 have a certain resistance value which is defined by the exponential relationship defined by Equation 1. Slider 30 on the bridge potentiometer 29 is then adjusted until the bridge is balanced and the output signal appearing between the slider 30 and grounded bridge terminal is zero.

Switch 33 is then closed causing heating current to flow, heating thermistor 14 so that it attains a temperature ($T_1$>25° C.). The resistance of thermistor 14 is, therefore, lower than that of thermistors 16 and 17 because of its negative coefficient of resistance characteristic, unbalancing the bridge until the bridge unbalance voltage equals the bias voltage at terminals 36.

When the two voltages are equal, there is, therefore, no input voltage to the integrating amplifier 32. With no input voltage, integrating amplifier 32 causes sufficient current to flow to heating resistance 11 to maintain the sensing thermistor 14 at the predetermined elevated temperature $T_1$ and the current indicating device 34 is calibrated to read zero indicating zero fluid flow.

With fluid flow in duct 10 thermistor 14 is cooled as the moving fluid carries heat away. The amount of cooling depends on how rapidly the heat is being carried away which in turn is a function of the magnitude of the flow in terms of mass flow, volume flow, or flow velocity through the duct 10. The flow of fluid past reference thermistor 16 and the compensating thermistor 17 on the other hand does not result in any cooling since these thermistors are already at ambient fluid temperature.

Cooling of thermistor 14 causes its resistance to increase and bridge 21 becomes unbalanced. A positive output voltage appears between the movable slider 30 and the grounded junction, the magnitude of which depends on the degree to which thermistor 14 is cooled. This output voltage is applied to the input circuit of the integrating amplifier 32 increasing the output heating current supplied to the heating element 11 to a new value. This increase in heating current through resistance 11 tends to reheat the thermistor 14 and make up for the heat losses due to fluid flow. The decrease in temperature of thermistor 14 is checked and reversed, and bridge 21 is again balanced so that the input voltage to integrator amplifier 32 goes to zero. The output heating current from the amplifier remains at the new value, however, to maintain sufficient current flow through resistance 11 to make up for the heat losses due to fluid flow over thermistor 14. As the magnitude of the flow conditions varies in either direction the bridge is continuously constrained to find a new balance condition at which sufficient current flows through the heating resistance 11 to maintain the balanced condition.

In actual operation, each time a measurement is desired the operator throws switch 33 to its "down" position connecting the output of the integrating amplifier 32 to the dummy resistance 37. This interrupts the flow of heating current to the thermistor heater 11 and the operator adjusts the potentiometer slider 30 until no further movement on the pointer of the current measuring device 34 can be noted. The operator then knows that the bridge is balanced for the actual flow and ambient temperature conditions at which the measurement is to be taken eliminating zero errors for the sensor which vary with temperature.

FIGURE 4 illustrates graphically a flow calibration curve for a measuring apparatus constructed in accordance with the invention as illustrated in FIGURE 3.

Such an apparatus was constructed with the following values of the various components:

Thermistor 14, thermistor 16, and thermistor 17=38C2 thermistors sold by the Veco Company
R11=560 ohm 1/10 watt potted Ohmite resistor
R37=560 ohm 1/10 watt potted Ohmite resistor
R35=4 ohm Manganin wound wire resistor
R27=500 ohms
R28=500 ohms
R29=500 ohm Helipot
Battery 24=2.68 volts As can be seen from the curve A of FIGURE 4 in which mass flow in pounds per minute is plotted along the abscissa and scale reading along the ordinate, the mass flow G is proportional to scale reading squared since the curve is generally a square law curve. Since the scale reading of thermocouple meter 34 itself is proportional to current square ($I^2$), the mass flow G is proportional to the scale reading squared.

Hitherto in describing the operation and construction of the flow measuring circuit of FIGURE 3, the entire device is operated to maintain a predetermined temperature differential between the sensing thermistor 14 and the reference thermistor 16 by producing a sufficient heating current from the feedback loop 31 to maintain the temperature differential constant. It has been found, however, that at very low flows severe non-linearities are present resulting in a compressed scale range with high zero reading.

This may be seen most clearly in curve C of FIGURE 5 in which mass flow G is plotted along the abscissa as the square root of the fraction of full scale flow and scale reading along the ordinate. As was pointed out above the mass flow G is proportional to scale reading squared (i.e. $S^2$). Therefore, the square root of mass flow $\sqrt{G}$ equals the scale reading S. Therefore, if G is actually proportional to $I^4$ (i.e. $G \propto KI^4$) as was hypothesized curve C should be linear throughout the operating range. However, as can be noted by inspection, curve C is not linear in its initial portion but seems to follow a square law which would indicate that at low flow the relationship of mass flow G to current I is of the order $G \propto I^6$. This, of course, results in an undesirable scale compression and may limit the usefulness of the instrument when small change of flow conditions at low flow levels must be measured.

It was also found, however, that one way of avoiding these additional non-linear effects at low flow levels is by varying the temperature differential $\Delta t$ between the sensing thermistor 14 and the reference thermistor 16 as a function of flow. This is accomplished by connecting a biasing resistor in a series with the bridge circuit so that a bias voltage is produced which is proportional to the heating current and hence a function of flow. As shown in FIGURE 3, the switch arm of manual switch 23 may be moved to connect the bridge 21 to ground through a biasing resistance 35. The heating current now flows from the output of the integrating amplifier 32 to ground through switch 33, heating resistance 11, and biasing resistance 35. The flow of current through resistance 35 produces voltage drop which varies with the magnitude of the heating current and hence with the magnitude of the flow. The biasing voltage developed across the resistance 35 is connected in series with the bridge unbalance voltage and is also applied to the input of the integrating amplifier 32.

Bridge 21 and the biasing network 22 are so connected and the direction of the current flow through the resistance 35 is such that the two voltages are of opposite polarity and the input to the amplifier is their algebraic sum. Since the amplifier controls the heater current level to cause the zero input voltage to itself, this condition is satisfied only when the bridge output voltage and the bias voltage are equal and of opposite polarity. Thus bridge unbalance voltage is made proportional to heater current or in other words, $\Delta t$ and the bridge unbalance voltage for a given flow condition are varied as a function of the heater current.

Curve D of FIGURE 5 illustrates, by comparison with curve C, the linearizing effect of the bias voltage produced across resistance 35. As can be seen from these two curves, without bias voltage, curve C is nonlinear along the initial portion so that at low flow $G \propto KI^6$. With the biasing arrangement, on the other hand, curve D is linear through the entire flow range and $G \propto KI^4$ over the entire flow range. The over-all utility of the flow measuring device is therefore greatly enhanced by virtue of the biasing network which controllably varies the temperature differential between the two thermistors.

The precise theoretical basis for the linearizing action of the bias means is not fully understood at this time. However, the following is proposed as a possible explanation:

It was pointed out earlier with reference to Equations 2–7 that the mass flow of the fluid is proportional to the 4th power of the heater current if the quantity $I^2R$ is very much larger than the quantity $$\frac{C_3}{C_4} \left( \text{i.e.} \ \frac{I^2R}{C_4} >> \frac{C_3}{C_4} \right)$$

The physical requirements to fulfill this condition are that the power to maintain a given $\Delta t$ with zero flow is small compared to the power required with flow. In other words, the heat losses at "no flow" due to conduction, convection and radiation must be low compared to the power required to make up the heat losses due to the cooling action of the flowing fluid. It is also possible that temperature gradient within the heating resistor contribute to the observed non-linearity. It is believed that if a large $\Delta t$ is utilized at low flow conditions the temperature gradient between the thermistor and the flow is sufficiently large so that a substantial amount of heat loss due to conduction, radiation and convection occurs, violating the assumed conditions and producing inaccuracies at low flow velocities. If, on the other hand, just enough current is caused to pass through the thermistor to maintain a very small temperature differential $\Delta t$ at the low flow, the temperature gradient is not sufficiently large to produce substantial convection, radiation, etc., losses, and hence the non-linearities due to these errors are minimized.

It will be understood that this explanation is offered as a tentative hypothesis only and that applicants' invention is not limited to or bound by the explanation and theory offered above.

In addition, it will also be understood by those skilled in the art that it is possible to replace the linear resistance 35 by nonlinear resistive elements of various types to permit difference degrees of linearization. Such a modification would fall clearly within the spirit and scope of this invention.

While a particular embodiment of this invention has been shown it will, of course, be understood that it is limited thereto since many modifications both in the circuit arrangement and in the instrumentalities employed may be made. It is contemplated by the appended claims to cover any such modifications which fall within the true spirit and scope of this invention.

What we claim as new and desire to secure by Letters Patent of the United States is:

1. In an apparatus for measuring fluid flow, the combination comprising a pair of thermally sensitive elements disposed in a fluid stream, heating means for maintaining a temperature differential between said sensitive elements including electrically operable indirect heating means positioned in heat exchange relationship with one of said thermally sensitive elements, a network for producing an electrical output signal proportional to the magnitude of the fluid flow, said network including a bridge means having said thermally sensitive elements connected as two arms thereof and having adjusting means for balancing the bridge for operating flow conditions whereby flow of the fluid cools one of said elements and disturbs the temperature differential between said elements to unbalance the bridge means and produce an electrical output from said bridge, said network also including feedback means electrically coupled to said bridge means and to said electrically operable heating means and responsive to the output electric current from said bridge means to control the heating electric current supplied to said electrically operable indirect heating means to maintain said temperature differential, a current measuring device connected in current relationship with said heating means for deriving an output indication of the value of heating current supplied to said heating means as a measure of fluid flow, and electrically operable means coupled to said bridge means and said heating means for linearizing the response of the apparatus at low flow rates by varying the temperature differential between said elements in response to varying flow conditions.

2. The flow measuring apparatus of claim 1 wherein said electrically operable means for linearizing the response of the apparatus at low flow rates by varying the temperature differential includes a resistor connected in circuit relationship with said bridge means and said heating means for producing a variable bias signal in response to the energy supplied by the heating means whereby the output of said bridge means varies both in response to the bridge condition and the heat energy supplied by said indirect heating means.

3. In an apparatus for measuring fluid flow, the combination comprising a pair of thermally sensitive resistance elements disposed in a fluid stream, resistance heating means positioned in heat exchange relationship with one of said resistance elements whereby said one resistance element is heated to a temperature above ambient fluid temperature and the other of said resistance element is maintained at ambient fluid temperature, network means for producing an electrical output signal in response to flow including a bridge having said resistance elements connected as arms thereof and having adjusting means for balancing the bridge for operating flow condition whereby the cooling effect of the flowing fluid varies the temperature difference between the said elements to unbalance the bridge, said network also including feedback means electrically connected to said bridge and to said heating means and responsive to the output from said bridge for controlling the current flow through said resistance heating means to heat said one resistance element sufficiently to overcome the flow-induced cooling effect, energizing means connected between one set of opposite terminals of said bridge for energizing said bridge, temperature compensating means connected in series circuit relationship with said bridge energizing means between said one set of opposed terminals of said bridge means, said temperature compensating means comprising a third negative temperature coefficient temperature sensitive element disposed in the fluid stream for varying the sensitivity of the bridge with variations in ambient temperature, and a current measuring device connected to said heating means for deriving an output indication of the value of the fluid flow.

4. In an apparatus for measuring fluid flow, the combination comprising a pair of thermistors disposed in a fluid stream, resistance heating means positioned in heat exchange relationship with one of said thermistors so that said one thermistor is heated to a temperature above ambient fluid temperature and the other thermistor is maintained at ambient fluid temperature, a network means for producing an electrical output signal in response to flow conditions including a bridge having said thermistor elements connected as two arms thereof and having adjusting means for balancing the bridge for operating flow conditions so that the cooling effect of the flowing fluid reduces the temperature of the heated thermistor and varies the temperature difference between the elements to control the bridge condition, a biasing resistor connected in series with said bridge output so that an electrical output signal is derived which is the algebraic sum of the outputs from said bridge and said biasing resistor, feedback means electrically connected to the output of said bridge and biasing resistor and to said heating means and responsive to the output signal from said bridge and biasing resistor for controlling the current flow through said resistance heating means to heat said one thermistor sufficiently to overcome the flow-induced cooling effect and raise its temperature, said resistance heating means being connected to the junction of the series connected bridge and biasing resistance so that said heating current flows through said biasing resistance to produce an electrical signal proportional to the current flow through said heating resistance and to vary the temperature difference between said thermistor in response to flow conditions, energizing means connected between one set of opposite terminals of said bridge for energizing the bridge, temperature compensating means comprising a third temperature sensitive element connected in series circuit relationship with said bridge energizing means between one set of opposite terminals of said bridge, said third temperature sensitive element being physically disposed in the fluid stream for varying the sensitivity of the bridge with variations in ambient temperature, and a current measuring device connected to said heating means for deriving an output indication of the value of the fluid flow.

5. In an apparatus for measuring fluid flow, the combination comprising first and second temperature responsive resistance elements positioned in a fluid stream and electrically connected as two arms of a control signal generating bridge, the temperature of said first resistance element being responsive to the flow of said fluid and the temperature of said second resistance element being responsive to the ambient temperature of said fluid, electrically operable indirect heating means positioned in heat exchange relationship with said one resistance element to raise the temperature above ambient so that the cooling effect of said fluid flow controls the condition of the bridge, adjusting means for balancing the bridge for operating flow condition, feedback means electrically connected to said bridge and to said heating means and responsive to the output from said bridge for varying the magnitude of the current flowing through said heating means to return said bridge to its balanced condition, energizing means connected between one set of opposed terminals of said bridge for energizing said bridge, and temperature compensating means connected in series circuit relationship with said bridge energizing means between said one set of opposed terminals to vary the sensitivity of said bridge with variations in ambient temperature, said temperature compensating means comprising a third temperature sensitive element disposed in the fluid stream for sensing the ambient temperature of the fluid and vary the energizing voltage of the bridge in accordance with the variations in ambient temperature, means to measure said heating current as an index of flow conditions, and switch means connected to said feedback means to interrupt the flow of heating current to said heating means to permit balancing of the bridge at the operating flow conditions.

References Cited in the file of this patent
UNITED STATES PATENTS

| | | |
|---|---|---|
| 2,694,928 | Jacobson | Nov. 23, 1954 |
| 2,726,546 | King | Dec. 13, 1955 |
| 2,728,337 | Guillemin | Dec. 27, 1955 |
| 2,729,976 | Laub | Jan. 10, 1956 |
| 2,800,018 | Phillips et al. | July 23, 1957 |
| 2,831,351 | Jacobson | Apr. 22, 1958 |
| 2,892,347 | Laprand | June 30, 1959 |
| 2,916,914 | Graves et al. | Dec. 15, 1959 |

FOREIGN PATENTS

| | | |
|---|---|---|
| 729,180 | Great Britain | May 4, 1955 |